Patented July 10, 1951

2,560,020

UNITED STATES PATENT OFFICE 2,560,020

METHOD OF MAKING N-ARYL THIAZYLSULFENAMIDES

George E. P. Smith, Jr., and Edward L. Carr, Akron, Ohio, assignors to The Firestone Tire & Rubber Company, Akron, Ohio, a corporation of Ohio No Drawing. Application November 21, 1947, Serial No. 787,480

4 Claims. (Cl. 260—306.6)

This invention relates to N-aryl thiazyl sulfenamides and the method of making the same. To prepare these compounds, an unsubstituted thiazylsulfenamide is mixed with an aryl amine having at least one replaceable hydrogen atom directly connected to the amino nitrogen atom. In the course of the reaction ammonia is eliminated, and the rate of evolution of ammonia is a measure of the progress of the reaction. The ammonia may be recovered if desired.

It is often convenient to use a solvent to facilitate mixing the reactants. Such solvent may be inert. In many cases an excess of amine may be used as the solvent. The reaction may be carried out in a water suspension or in a mixed solvent, such as alcohol-water mixtures or in a solvent immiscible with water. Using the preferred reactant ratio an excess of the amine is employed.

Exemplary of amines for the purpose of reacting with any thiazyl sulfenamide as described, are the following:

p-tert-Amylaniline
p-Phenetidine
p-Anisidine
p-Phenylaniline
2,4-dimethylaniline
2,4-diamylaniline
2,5-dimethylaniline
3,5-dimethylaniline
2,4,6-trimethylaniline
2,3,5-trimethylaniline
2,3,4,5-tetramethylaniline
Pentamethylaniline
Beta-naphthylamine
Alpha-naphthylamine
Methyl-beta-naphthylamine
Butyl-beta-naphthylamine
Dibutyl-beta-naphthylamine
Octyl-beta-naphthylamine
Butyl-alpha-naphthylamine
Aniline
p-Toluidine
p-Butylaniline
o-Toluidine Exemplary of thiazyl sulfenamides which may be reacted with any of the amines, as aforesaid, are the following:

Benzothiazyl 2-sulfenamide
Naphthothiazyl 2-sulfenamide
6-chlorobenzothiazyl 2-sulfenamide
4-ethoxybenzothiazyl 2-sulfenamide
6-phenylbenzothiazyl 2-sulfenamide
6-nitrobenzothiazyl 2-sulfenamide
4-methylbenzothiazyl 2-sulfenamide
5-ethylbenzothiazyl 2-sulfenamide
6-tert-Butylbenzothiazyl 2-sulfenamide
Thiazyl 2-sulfenamide
4,5-dimethylthiazyl 2-sulfenamide
4,5-diethylthiazyl 2-sulfenamide
4-methylthiazyl 2-sulfenamide
4-ethylthiazyl 2-sulfenamide
4-butylthiazyl 2-sulfenamide
5-ethylthiazyl 2-sulfenamide Suitable solvents for the process include the following:

Methanol
Ethanol
Propanol
Butanol
Formamide
Dimethylformamide
Ether
Dioxane
Benzene
Chlorobenzene
Xylene
Toluene
Glycolmonomethyl ether
Glycol-diethylether The following example in which parts are by weight further illustrates the invention:

Thirty-one grams (0.3 mole) aniline and 18.23 grams (0.1 mole) unsubstituted benzothiazyl 2-sulfenamide were heated at 70–80° C. for 1 hour under a vacuum which aided in the removal of ammonia as formed. The reaction mixture, on standing over night at room temperature, turned to a dark brown liquid. This was extracted with two 100 cc. portions of petroleum ether to remove the excess aniline. The residue was dissolved in 200 cc. of ether, leaving insoluble matter which was believed to be benzothiazyldisulfide. On removal of the ether, N-phenylbenzothiazyl 2-sulfenamide remained. It was identified by the usual test for sulfenamides; namely, reduction with sodium hydrosulfite which gave mercaptobenzothiazole. The latter was identified by melting point and mixed melting point determinations.

Similarly, other amines may be reacted with other thiazyl 2-sulfenamides. This application is a continuation of our application S. N. 690,336 filed August 13, 1946, now abandoned. The invention is defined in the appended claims.

What we claim is:

1. A method of preparing sulfenamides which comprises reacting an arylene thiazyl 2-sulfenamide having an unsubstituted amide group with an aryl amine having at least one replaceable hydrogen atom directly connected to the amino nitrogen atom.

2. A method of preparing sulfenamides which comprises reacting an arylene thiazyl 2-sulfenamide having an unsubstituted amide group with aniline.

3. A method of preparing sulfenamides which comprises reacting a thiazyl 2-sulfenamide having an unsubstituted amide group with an aryl amine having at least one replaceable hydrogen atom directly connected to the amino nitrogen atom.

4. The method of preparing N-phenylbenzothiazyl-2-sulfenamide which comprises heating aniline with benzothiazyl-2-sulfenamide, in the ratio of at least one mole of aniline per mole of sulfenamide, under a vacuum to aid in removing gaseous ammonia as formed during the resulting reaction, and separating the desired substituted benzothiazyl-2-sulfenamide from the reaction mixture.

GEORGE E. P. SMITH, Jr.
EDWARD L. CARR.

REFERENCES CITED

The following references are of record in the file of this patent:

UNITED STATES PATENTS

| Number | Name | Date |
| --- | --- | --- |
| 2,370,253 | Messer | Feb. 27, 1945 |
| 2,382,793 | Howland | Aug. 14, 1945 |
| 2,476,818 | Carr et al. | July 19, 1949 |